United States Patent [19]

Hetzel et al.

[11] Patent Number: 4,525,230

[45] Date of Patent: Jun. 25, 1985

[54] METHOD OF MANUFACTURING A BALLAST RESISTOR SUPPORT MEMBER

[75] Inventors: Frederick Hetzel, Brookpark; William G. McCracken, Jr., Highland Heights, both of Ohio

[73] Assignee: General Electric Company, Schenectady, N.Y.

[21] Appl. No.: 668,683

[22] Filed: Nov. 5, 1984

Related U.S. Application Data

[60] Continuation of Ser. No. 490,745, May 2, 1983, , which is a division of Ser. No. 248,550, Mar. 27, 1981, Pat. No. 4,418,328.

[51] Int. Cl.[3] .......... B32B 5/08

[52] U.S. Cl. .......... 156/179; 156/243; 156/244.12; 156/244.13; 156/244.22; 264/174; 264/272.14; 338/20; 338/296; 338/301

[58] Field of Search .......... 156/179, 243, 244.11, 156/244.12, 244.13, 244.15, 244.22, 244.25; 264/174, 271.1, 272.14, 272.15; 338/20, 296, 301

[56] References Cited

U.S. PATENT DOCUMENTS

| | | | |
|---|---|---|---|
| 1,014,875 | 1/1912 | Hewitt | 338/296 |
| 2,293,045 | 8/1942 | Crowell | 338/20 |
| 2,712,048 | 6/1955 | Huetten et al. | 338/301 |
| 2,758,342 | 8/1956 | Squires | 428/295 |
| 2,887,721 | 5/1959 | Blanchi et al. | 156/244.13 |
| 3,230,127 | 1/1966 | Cleereman et al. | 156/244.13 |
| 3,499,816 | 3/1970 | Aresroug | 156/244.12 |
| 3,523,844 | 8/1970 | Crimmins et al. | 156/179 |
| 3,589,958 | 6/1971 | Schrenk | 156/244.14 |
| 3,802,974 | 4/1974 | Emmel | 156/179 |
| 3,862,868 | 1/1975 | Spillers | 156/244.14 |
| 3,996,493 | 12/1976 | Davenport et al. | 315/58 |
| 4,002,789 | 1/1977 | Klein | 428/108 |
| 4,055,526 | 10/1977 | Kiyokawa et al. | 264/174 |

*Primary Examiner*—Caleb Weston
*Attorney, Agent, or Firm*—J. F. McDevitt; Philip L. Schlamp; Fred Jacob

[57] ABSTRACT

A method of manufacturing a reinforced strip of insulative material comprising the steps of extruding a thermoplastic insulative material in the shape of a tube or spaced apart strips about a plurality of separated and substantially parallel reinforcing strands positioned within said tube or strips and compressing and cooling the tube or strips to form a flattened single strip having opposed flattened sides with the reinforcing strands firmly secured therebetween is disclosed. A reinforced support for a ballast resistor manufactured in accordance with the described method is also disclosed.

3 Claims, 5 Drawing Figures

METHOD OF MANUFACTURING A BALLAST RESISTOR SUPPORT MEMBER

This application is a continuation of application Ser. No. 490,745, filed May 2, 1983, which is a division of application Ser. No. 248,550, filed Mar. 27, 1981, and now U.S. Pat. No. 4,418,328.

BACKGROUND OF THE INVENTION

This invention relates to a new and improved method for manufacturing a reinforced strip having a cross section of considerably greater width than thickness with the opposing longer sides being substantially parallel and the opposing shorter sides being convex or round. More specifically it relates to a method for manufacturing a reinforced insulative strip to be used as a member to support a resistive wire. The combination of the resistive wire and the reinforced insulative strip may be used to form a ballast resistor for a gas discharge lamp such as a fluorescent lamp unit as disclosed in U.S. Pat. No. 3,996,493 Davenport et al and assigned to the same assignee as the present invention.

A current method of manufacturing ballast resistors for use in gas discharge lamp units involves helically winding a resistive wire around a strip of insulative material, placing a plurality of substantially lengthwise parallel reinforcing fibers or strands over the resistive wires on each side of the strip and then gluing the fibers onto the strip in order to reinforce the strip.

In the final assembly of a lamp unit housing of the type disclosed in the above-noted patent, the housing is extruded with the ballast resistor embedded therein such that the resistive wires are beneath the surface of the housing and approximately equidistant from the opposing surface of the holder. In one prior method, the strip of material is formed of a thermoplastic insulative material and the reinforcing strands are formed of fiberglass. The temperature of this secondary extrusion process is sufficient to soften or melt the thermoplastic insulative material of the reinforced strip of the ballast resistor. The forces involved with pulling the ballast resistor through the melt flow and the extruder during the formation of the housing are sufficient to distort and elongate an unreinforced ballast resistor. This distortion and elongation causes the given value of resistance per unit length of resistor to vary. It is because of this secondary extrusion process and the need to maintain a uniform resistance over the length of the resistor for the lamp to operate properly that the reinforcing strands are necessary.

Numerous problems have been encountered due to the positioning of the reinforcing strands on top of the resistive wires and the resultant increased thickness of the ballast resistor. Among these problems are the following: the extrusion die tends to abrade the reinforcing strands in the secondary extrusion process; the reinforcing strands are subject to being severed in the secondary extrusion process; the ballast resistor becomes positioned within the resistor holder formed by the secondary extrusion process such that the resistor is located undesirably close to an outer surface of the holder; the process of gluing reinforcing strands over the resistive wires is time consuming, expensive and does not lend itself to rapid production of the resistors as is required to increase the product output of the lamp in an assembly line environment.

Several problems are encountered when attempting to place the reinforcing strands within the thermoplastic melt flow during the extrusion of the strip. For example, the reinforcing strands, inasmuch as they are not rigid, are caused to deviate from their initial positions at the center of the extrusion die due to the pressure of the extrusion process. Such deviations cause the strands to break through the surface of the strip as the strip leaves the extruder, creating an unacceptable product and making it difficult to re-centralize the strands in the center of the extruding die in order to continue the operation.

SUMMARY OF THE INVENTION

An object of the present invention is to provide a new and improved method for the manufacture of a reinforced insulative resistor support strip.

Another object of the present invention is to provide a new and improved method for the manufacture of a reinforced insulative resistor support strip, which method positions the reinforcing strands to protect them from abrasions or severance during a secondary extrusion process.

Another object of the present invention is to provide a new and improved method for the manufacture of a reinforced insulative resistor support strip wherein the resistor manufactured using the strip is thinner than those manufactured using a prior method.

Another object of the present invention is to provide a new and improved method for the manufacture of a reinforced insulative resistor support strip wherein the reinforcing strands are positioned within the material of the strip to be reinforced.

Another object of the present invention is to provide a new and improved method for the manufacture of a reinforced insulative resistor support strip wherein the method is capable of producing such a strip in a substantially continuous operation and thereby obtaining a strip which is less expensive and thus more economical to manufacture.

Still another object of the present invention is to provide a new and improved reinforced insulative resistor support strip.

In accordance with the present invention, a thermoplastic insulative material is extruded through a die to form a pair of spaced apart opposing walls. Said opposing walls can be extruded as separate flat strips or a tube of oval cross section having both walls aligned in a substantially horizontal plane. As the opposing walls are formed, a plurality of separated and substantially parallel reinforcing strands, are continuously fed and positioned between said opposing walls to lie in said common plane coextensive with the longitudinal and major axes thereof. The composite assembly is then fed between cooled rollers whereby the opposing thermoplastic walls are flattened together and cooled. The output from the rollers is a flattened strip of insulative material having substantially rectangular cross section with a width substantially greater than the thickness, round or convex opposing edges and strands firmly embedded between the compressed walls to reinforce the strip.

DETAILED DESCRIPTION

Figures 1, 2, 3:
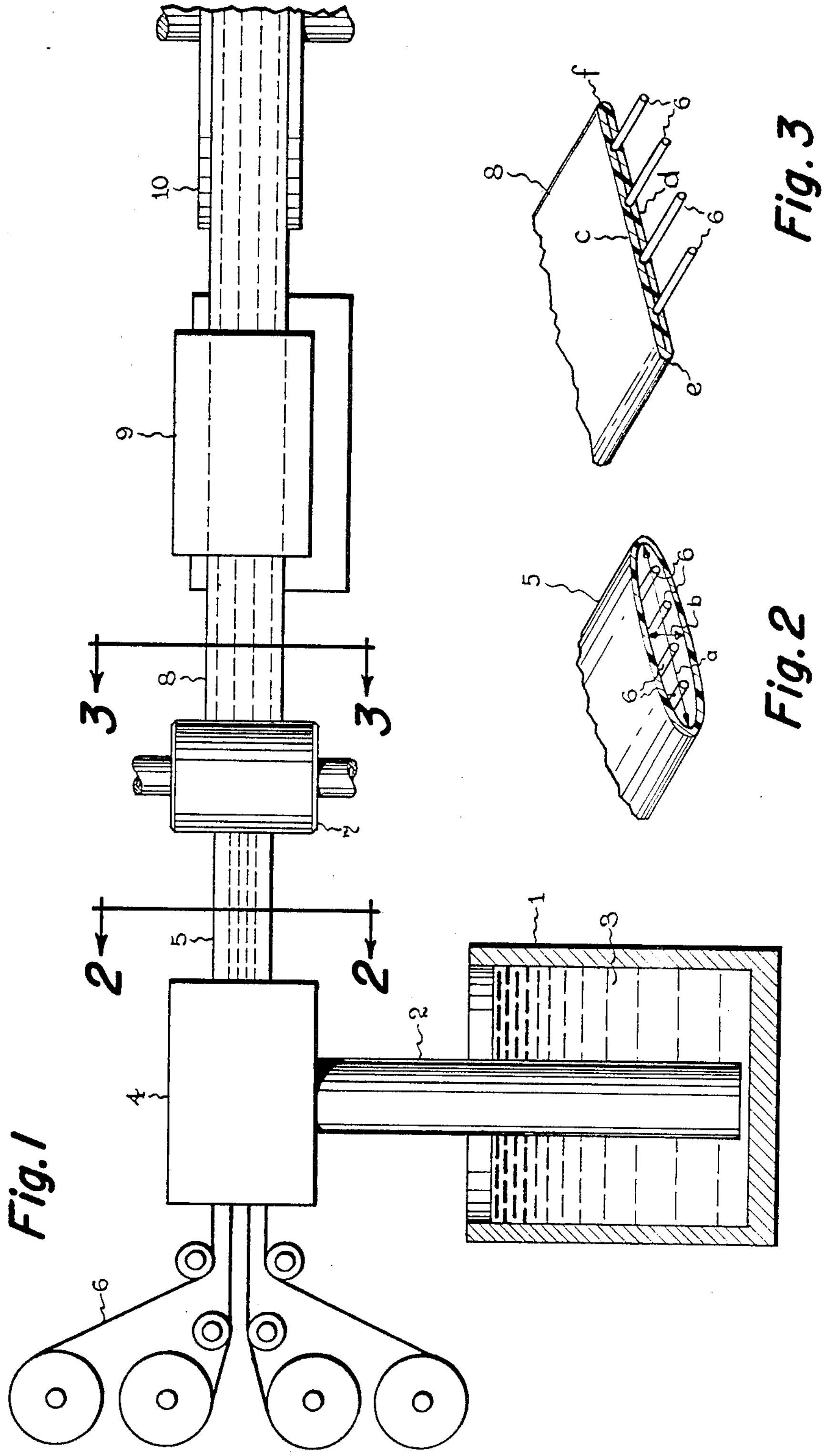
FIG. 1 is a block flow diagram illustrating the method of the present invention.
FIG. 2 is a fragmentary perspective view at the line 2—2 of FIG. 1 illustrating the reinforcing strands within the tube as it is formed at one stage of the method of the present invention.
FIG. 3 is a fragmentary perspective at the line 3—3 of FIG. 1 illustrating the reinforced strip as it is formed at a subsequent stage of the method of the present invention.

Referring to FIG. 1, a reservoir 1 of an extruder 2 is filled with molten material 3, preferably a synthetic thermoplastic insulative material such as Noryl (TM) phenylene oxide-based resin obtainable from the General Electric Company. The molten material 3 is forced through the extruder 2 to a cross head extrusion die 4 which forms the material into a tube 5 having a hollow, closed shape. The tube 5 is preferably oval in cross section, having a major axis "a" and a minor axis "b" (FIG. 2) which minor axis is no greater than that necessary to permit the introduction of reinforcing strands 6 into the tube without deforming the oval shape of the tube. This minimizes the lateral extension of the tube along its major axis "a" (FIG. 2) when the tube is compressed. The reinforcing strands or roving 6 are preferably formed of fiberglass and are continuously placed and positioned within the tube 5 as the tube is extruded, such that the strands are in a common plane and are coextensive with the longitudinal and major axes of the tube. This is accomplished by introducing the strands into the die 4 in a single horizontal plane.

This method of strand placement permits the operation to be substantially continuous which increases the product out-put and eliminates the step of a prior method wherein strands were placed over the resistive wire and glued onto both sides of a strip. The placement of the strands within the tube as the tube is extruded also permits the number of reinforcing strands required to be substantially less than those needed when the reinforcing strands are glued externally to a strip. This can greatly reduce material and handling costs.

As the tube 5 leaves the die 4 it is fed between flattening rollers 7 containing a suitable coolant. The flattening rollers concurrently compress and cool the tube such that a strip 8 is formed with the strands 6 firmly secured between the compressed walls of the tube. The tube is compressed enough and at a sufficiently high temperature to form a unitary structure. Referring to FIG. 3, the finished flattened strip has a cross section of considerably greater width than thickness and the opposing wider sides "c" and "d" are substantially parallel and opposing edges "e" and "f" are convex or rounded.

Again referring to FIG. 1, it can be seen that the reinforced strip 8 is fed to a puller 9 and a take up means 10, such as a roller, whereon the strip is stored for future use.

Figure 4:
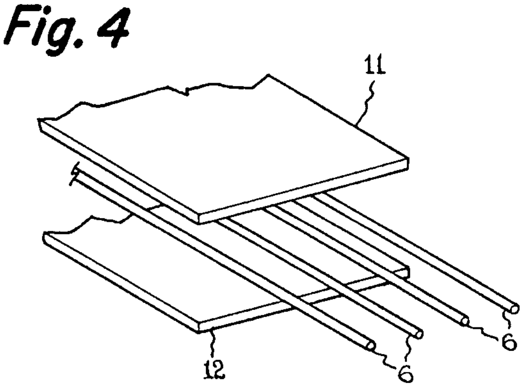
FIG. 4 is a fragmentary perspective view depicting an alternative embodiment to form the reinforced strip according to the present invention.

In FIG. 4 there is depicted in cross section an alternative embodiment whereby the reinforced insulative strip 8 is formed with a pair of extruded thermoplastic flat strips according to the method of the present invention. Consequently, the same numeral identification of common parts is employed in describing said alternative construction as was made use of in the already described drawings. Said reinforced strip is formed with a pair of spaced apart thermoplastic flat strips 11 and 12 which are extruded simultaneously through the same type cross head extrusion die already mentioned so as to extend longitudinally in a substantially horizontal plane. Similarly, four reinforcing strands 6 are contemporaneously fed between said spaced apart flat strips to lie in said common horizontal plane and extend in the same direction as the longitudinal axis of said extruded thermoplastic strips. Subsequent compression and cooling of the composite assembly in a continuous manner as previously described provides a final reinforced insulation strip having a substantially rectangular cross section with a width substantially greater than thickness and round opposing edges with the reinforcing strands being securely embedded in the center.

Figure 5:
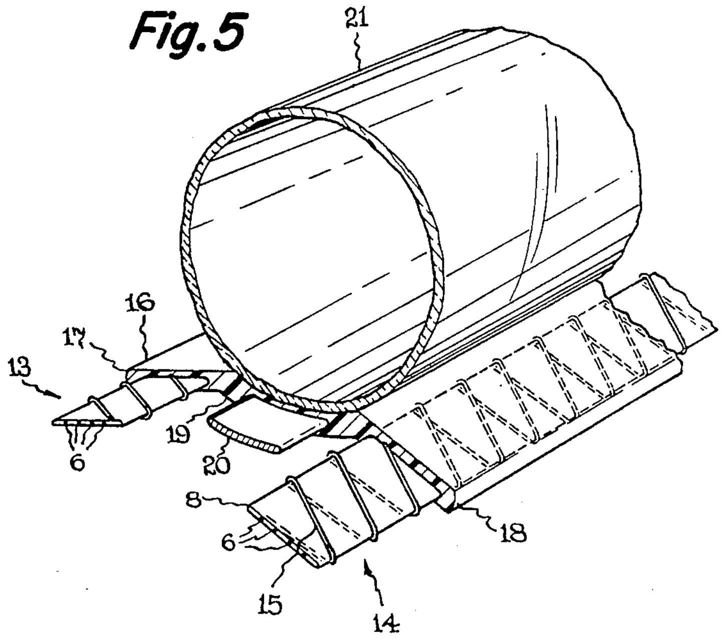
FIG. 5 is a perspective sectional view showing the manner in which ballast resistors made with the use of reinforced insulative strips of the present invention are used in the final assembly of gas discharge lamp units.

The use of a reinforced strip as manufactured in accordance with the present invention is shown in a gas discharge lamp unit illustrated in FIG. 5. In the unit shown, ballast resistors 13 and 14 each comprise a helically wound resistive wire 15 on a reinforced strip 8 of the present invention. A housing 16 comprises a pair of outwardly oppositely extending resistor holders or wing portions 17 and 18 and a central portion 19. The housing 16 is extruded in a secondary process as a unitary member in which the ballast resistors 13 and 14 and a metal strip 20 are pulled through the melt flow and die (not shown) used to form the extruded housing. The housing is preferably formed of a thermoplastic insulative material.

The temperature of the melt flow in this secondary extrusion process is sufficient to soften or melt the thermoplastic insulative material of the reinforced strips 8. Thus without the reinforcing strands the strips would be subject to stretching and elongation resulting from the forces involved in the secondary extrusion process. This in turn would stretch the resistive wire 15 wound on the strip and would cause the given value of resistance per unit length of the ballast resistors 13 and 14 undesirably to vary. It is necessary to maintain a constant value per unit length for the ballast resistors in order for the lamp 21 mounted on the housing to operate properly.

For considerations of heat dissipation and electrical operation, the ballast resistors 13 and 14 must be positioned a minimum distance from the outer surfaces of the resistor holders 17 and 18. The ballast resistor using a reinforced strip 8 of the present invention is thinner than a ballast gluing reinforcing strands over the resistive wire on both sides of a strip of material, and thus the resistors of the present invention are easier to position within the resistor holders so as to maintain the required minimum distance from the surface of the resistance holder.

Although the preferred embodiment and method of practicing the invention of the present application have been disclosed, other configurations will become obvious to one skilled in the art. For instance, although only one roller means is shown it would be obvious to one skilled in the art that separate compressing and cooling means could be used. The scope of this invention is only to be limited by the appended claims.

What we claim as new and desire to secure by Letters Patent of the United States is:

1. The method of manufacturing a ballast resistor for a gas discharge lamp unit comprising the steps of:

(a) extruding a tube of thermoplastic insulative material through an extrusion die shaped as an oval with a minor axis having sufficient width to permit the introduction of strands of fiberglass within said tube without deforming the shape of the tube;

(b) feeding said strands continuously into said extruded tube after emergence from said extrusion die;

(c) positioning said strands within said tube in a common plane and coextensive with the longitudinal and major axes thereof;

(d) compressing and concurrently cooling said tube to form a substantially flat strip and secure said strands firmly between the opposed walls thereof;

(e) helically winding a restrictive wire uniformly along said flat strip to produce a uniform electrical resistance value per unit length of said ballast resistor as the result of minimizing both elongation and thickness variation with said placement of the fiberglass strands; and (f) further extending thermoplastic insulative material around both major surfaces of said wire-wound resistor strip so as to centrally position the strip in said extruded material.

2. The method of manufacturing a ballast resistor for a gas discharge lamp unit comprising the steps of:

(a) continuously extruding a pair of spaced apart flat strips of said thermoplastic insulative material through an extrusion die and aligned with major surfaces to lie in a substantially horizontal plane, said strips having sufficient width to permit introduction of strands of fiberglass therebetween;

(b) introducing a plurality of separated and substantially parallel reinforcing strands continuously between said spaced apart extruded flat strips after emergence from said extrusion die to lie in said substantially horizontal plane and extend coextensive with the longitudinal axis of said extruded flat strips;

(c) compressing and concurrently cooling said extruded flat strips while moving to a form a single flat strip having the reinforcing strands firmly embedded in the center;

(d) helically winding a resistive wire uniformly along said flat strip to produce a uniform electrical resistance value per unit length of said ballast resistor as the result of minimizing both elongation and thickness variation with said placement of the fiberglass strands; and (f) further extruding thermoplastic insulative material around both major surfaces of said wire-wound resistor strip so as to centrally position the strip in said extruded material.

3. A method of manufacturing a ballast resistor for a gas discharge lamp unit comprising the steps of:

(a) extruding a pair of opposing flat aligned strips of thermoplastic insulative material through an extrusion die, said strips having sufficient width to permit introduction of strands of fiberglass therebetween;

(b) feeding said strands continuously between said aligned strips after emergence from said extrusion die;

(c) compressing the strips together to form a substantially flat single strip having said strands firmly embedded therebetween with a width substantially greater than thickness and round opposing edges;

(d) helically winding a resistive wire uniformly along said flat strip to produce a uniform electrical resistance value per unit length of said ballast resistor as a result of minimizing both elongation and thickness variation with said placement of the fiberglass strands; and (f) Further extruding thermoplastic insulative material around both major surfaces of said wire-wound resistor strip so as to centrally position the strip in said extruded material.

* * * * *